(12) United States Patent
Chang et al.

(10) Patent No.: US 9,921,817 B2
(45) Date of Patent: Mar. 20, 2018

(54) APPLICATION NAME MODIFICATION METHOD AND DEVICE, AND STORAGE MEDIUM

(71) Applicant: ZTE Corporation, Shenzhen, Guangdong (CN)

(72) Inventors: Zhe Chang, Shenzhen (CN); Bo Liu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/031,880

(22) PCT Filed: Jun. 3, 2014

(86) PCT No.: PCT/CN2014/079097
§ 371 (c)(1),
(2) Date: Apr. 25, 2016

(87) PCT Pub. No.: WO2014/180421
PCT Pub. Date: Nov. 13, 2014

(65) Prior Publication Data
US 2016/0266880 A1    Sep. 15, 2016

(30) Foreign Application Priority Data
Oct. 29, 2013    (CN) .......................... 2013 1 0522688

(51) Int. Cl.
*G06F 9/445*    (2006.01)
*G06F 9/44*    (2006.01)
(52) U.S. Cl.
CPC ................. *G06F 8/54* (2013.01); *G06F 8/34* (2013.01); *G06F 8/65* (2013.01)

(58) Field of Classification Search
CPC ...... G06F 8/33–8/34; G06F 8/54; G06F 8/65; G06F 8/71
See application file for complete search history.

(56) References Cited

U.S. PATENT DOCUMENTS 5,327,568 A * 7/1994 Maejima ................... G06F 8/34
345/441
5,745,902 A * 4/1998 Miller ............... G06F 17/30179
(Continued)

FOREIGN PATENT DOCUMENTS

CN    1904889 A    1/2007
CN    101008993 A    8/2007
(Continued)

OTHER PUBLICATIONS

CN101008993 English Translation, Translated by Espacenet on Jun. 11, 2017, pp. 1-21.*
(Continued)

*Primary Examiner* — Tuan Q Dam
*Assistant Examiner* — Zheng Wei
(74) *Attorney, Agent, or Firm* — Cooper Legal Group, LLC

(57) ABSTRACT

An application name modification method, said method comprising: selecting a target application and, by means of a preset application inlet, modifying the application name of the selected target application; obtaining original information regarding the selected target application, and linking together and storing the obtained original information regarding said target application and the modified new application name. Additionally disclosed are an application name modification device and a computer-readable storage medium.

6 Claims, 1 Drawing Sheet

(56) References Cited

U.S. PATENT DOCUMENTS

| | | | | |
|---|---|---|---|---|
| 6,804,682 B1* | 10/2004 | Kemper | | G06F 8/72 |
| 7,146,631 B1* | 12/2006 | Tanaka | | H04H 40/90 |
| | | | | 348/E7.071 |
| 9,317,240 B2* | 4/2016 | Lee | | G06F 3/14 |
| 2003/0034998 A1* | 2/2003 | Kodosky | | G05B 19/0426 |
| | | | | 715/736 |
| 2006/0136895 A1* | 6/2006 | Barr | | G06F 8/65 |
| | | | | 717/168 |
| 2006/0206863 A1* | 9/2006 | Shenfield | | G06F 8/10 |
| | | | | 717/107 |
| 2007/0168940 A1* | 7/2007 | Lunawat | | G06F 8/71 |
| | | | | 717/108 |
| 2010/0223579 A1 | 9/2010 | Schwartz | | |
| 2013/0210488 A1* | 8/2013 | Lee | | G06F 3/14 |
| | | | | 455/557 |
| 2014/0359505 A1* | 12/2014 | Cisler | | G06F 17/30103 |
| | | | | 715/769 |
| 2015/0370549 A1* | 12/2015 | Zhang | | G06F 8/60 |
| | | | | 717/172 |
| 2016/0227343 A1* | 8/2016 | Shen | | G06F 8/61 |
| 2017/0052766 A1* | 2/2017 | Garipov | | G06F 8/34 |
| 2017/0083290 A1* | 3/2017 | Bharthulwar | | G06F 8/20 |
| 2017/0109142 A1* | 4/2017 | Kaushal | | G06F 8/34 |
| 2017/0168782 A1* | 6/2017 | Boyd | | G06F 8/34 |

FOREIGN PATENT DOCUMENTS

| | | |
|---|---|---|
| CN | 103324471 A | 9/2013 |
| JP | H0612208 A | 1/1994 |
| JP | 2001282519 A | 10/2001 |
| JP | 201284180 A | 4/2012 |

OTHER PUBLICATIONS

International Search Report in international application No. PCT/CN2014/079097, dated on Sep. 4, 2014, 2 pgs.

English Translation of the Written Opinion of the International Search Authority in international application No. PCT/CN2014/079097, dated Sep. 4, 2014, 6 pgs.

Lin Youshu, free access to convenient family applications Androider +, Japan, Impress japan, Sep. 6, 2012, vol. 2, No. 2, 4 pgs.

For the Androider application development beginners JAVA entry Nikkei Software, Japan, Nikkei BP, Oct. 24, 2013, vol. 16, No. 12, ISSN:1347-4685, 12 pgs.

* cited by examiner

APPLICATION NAME MODIFICATION METHOD AND DEVICE, AND STORAGE MEDIUM

TECHNICAL FIELD

The disclosure relates to application processing in an android platform, and in particular to a method and device for modifying an application label, and a non-transitory computer-readable storage medium.

BACKGROUND

Customization has always been popular in mobile terminal users. With rapid development of smart mobile platforms, particularly open android platforms launched by Google, there are increasing demands of terminal users for customization. To facilitate applications, a user may expect to be able to change an application name to be displayed as needed, just as in an operating system in a Personal Computer (PC).

In related art, changing an application name displayed may be supported by some software, usually with a root permission required, or effectively only by software on a current desktop. A user-changed application name displayed will no longer work upon desktop changing.

SUMMARY

Embodiments herein provide a method and device for modifying an application label, and a non-transitory computer-readable storage medium, such that a user is allowed to modify an application label as needed in any desktop without needing a specific permission.

A technical solution according to an embodiment herein may be implemented as follows.

According to an embodiment herein, a method for modifying an application label includes:

receiving a selected target application, and modifying, via a pre-set application gateway, an application label of the selected target application to be a new application label; and obtaining original information on the selected target application, and storing the new application label in association with the obtained original information on the target application.

The storing the new application label in association with the obtained original information on the target application may include: storing the new application label in a list of applications together with the obtained original information on the target application.

The original information on the target application may include a package name and a class name that uniquely identify the target application.

The storing the new application label in association with the obtained original information on the target application may include: constructing a mapping structure, and storing, in the mapping structure, the new application label, the obtained package name and the obtained class name of the target application respectively as application items.

A mapping structure may serve as a node of application items in the list of applications.

The modifying, via a pre-set application gateway, an application label of the selected target application to be a new application label may include:

receiving the input new application label via the application gateway, and sending an acknowledgment message including the new application label.

The obtaining original information on the selected target application, and storing the new application label in association with the obtained original information on the target application may include:

after receiving the acknowledgment message, obtaining the package name and the class name of the selected target application; reading data in nodes of application items; in response to determining that there is, in the read data, a matching application with a package name and a class name that match the obtained package name and the obtained class name, replacing an application label of the matching application in the data in the nodes of application items with the new application label, and displaying the new application label; in response to determining that there is, in the read data, no matching application with a package name and a class name that match the obtained package name and the obtained class name, constructing a mapping structure, storing, in the mapping structure, the new application label included in the acknowledgment message together with the obtained package name and the obtained class name, and placing the mapping structure in the list of applications as a new node of application items.

The reading data in nodes of application items may include: in response to determining that a number of read nodes of application items is 0, ending a current operation; in response to determining that a number of read nodes of application items is greater than 0, reading data in each of the nodes of application items and matching a package name and a class name of an application in the read data to the obtained package name and the obtained class name, until a matching application is found or until the matching has been performed for each of the nodes of application items.

According to an embodiment herein, a device for modifying an application label includes an application gateway unit and a mapping unit.

The application gateway unit may be configured for: after a target application is selected, modifying an application label of the selected target application to be a new application label according to an input.

The mapping unit may be configured for obtaining original information on the selected target application, and storing the new application label in association with the obtained original information on the target application.

The mapping unit may be configured for storing the new application label in association with the obtained original information on the target application by: storing the new application label in a list of applications together with the obtained original information on the target application.

The original information on the target application may include a package name and a class name that uniquely identify the target application.

The mapping unit may be configured for storing the new application label in association with the obtained original information on the target application by: constructing a mapping structure, and storing, in the mapping structure, the new application label, the obtained package name and the obtained class name of the target application respectively as application items. A mapping structure may serve as a node of application items in the list of applications.

The device may further include an application display unit configured for receiving and displaying the new application label.

The application gateway unit may be configured for modifying the application label of the selected target application to be the new application label according to the input by: receiving the input new application label, and sending an acknowledgment message including the new application label.

The mapping unit may be configured for: after receiving the acknowledgment message, obtaining the package name and the class name of the selected target application; reading data in nodes of application items; in response to determining that there is, in the read data, a matching application with a package name and a class name that match the obtained package name and the obtained class name, replacing an application label of the matching application in the data in the nodes of application items with the new application label, and sending a modification message including the new application label to the application display unit.

The application display unit may be configured for displaying the new application label according to the modification message.

The mapping unit may be configured for reading the data in the nodes of application items by: in response to determining that a number of read nodes of application items is 0, ending a current operation; in response to determining that a number of read nodes of application items is greater than 0, reading the data in the nodes of application items node by node.

According to an embodiment herein, a non-transitory computer-readable storage medium includes instructions for executing the method for modifying an application label. With the method and device for modifying an application label and the non-transitory computer-readable storage medium according to embodiments herein, a target application is selected, and an application label (applabel) of the selected target application is modified, via a pre-set application gateway, to be a new application label; and original information on the selected target application is obtained, and the new application label is stored in association with the obtained original information on the target application. Correspondingly, when the target application is to be used, after a user selects the target application, an operating system of a terminal will obtain the original information on the target application according to the new application label stored in association with the original information on the target application to complete a subsequent operation on the target application. Thus, with embodiments herein, a user is allowed to modify an application label as needed in any desktop without impacting normal use of an application and without the need for a specific permission, thereby reflecting a personal style of the user and improving user experience.

DETAILED DESCRIPTION

With embodiments herein, a target application is selected, and an application label of the selected target application is modified, via a pre-set application gateway, to be a new application label; and original information on the selected target application is obtained, and the new application label is stored in association with the obtained original information on the target application.

Correspondingly, when an application with a modified application label is to be used, after a user selects the target application, an operating system of a terminal will obtain the original information on the target application according to the new application label stored in association with the original information on the target application to complete a subsequent operation on the target application. An application to be used may be an application to be opened or to be run.

The pre-set application gateway may be an application gateway set on a desktop of the terminal. The user may enter an application label modification interface such as by clicking on the application gateway. The interface may contain an acknowledgement option. Alternatively, an option may be set in the terminal. A window may pop up when the option is selected. The modified new application label may be input in the window. The window may further contain an acknowledgement option. For example, when the user needs to modify an application label of an application, the user may select the target application via an applist interface on the desktop of the terminal. A modification dialog will pop up when the user touches an icon corresponding to the application. The dialog may contain an input box for inputting a new application label. The dialog may further include an acknowledgement button and a cancel button.

The new application label may be stored in association with the original information on the target application by: storing the new application label together with the original information on the target application, such as in a list of applications (applist). The original information on each application and the new application label corresponding to the each application may serve as a list item in the list of applications. The original information on the target application may include at least a package name and a class name that uniquely identify the target application.

The disclosure is further elaborated below with reference to the drawings and embodiments.

Figure 1:
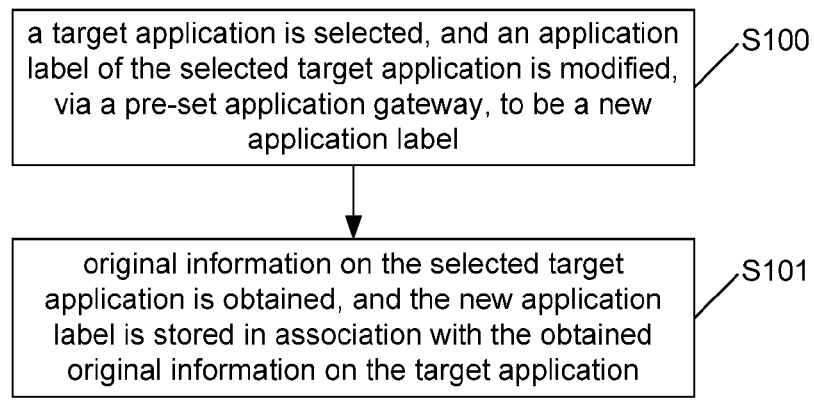
FIG. 1 is a flowchart of a method for modifying an application label according to an embodiment herein.

FIG. 1 is a flowchart of a method for modifying an application label according to an embodiment herein. As shown in FIG. 1, the method for modifying an application label according to an embodiment herein includes steps as follows.

In S100, a target application is selected, and an application label of the selected target application is modified, via a pre-set application gateway, to be a new application label.

A user may select a target application of which an application label needs to be modified, and then input a new application label of the selected target application via a pre-set application gateway. Refer description above for the application gateway.

In S101, original information on the selected target application is obtained, and the new application label is stored in association with the obtained original information on the target application.

The new application label may be stored in association with the obtained original information on the target application by: storing the new application label in a list of applications together with the obtained original information on the target application. The original information on the target application may include a package name and a class name that uniquely identify the target application.

The new application label may be stored in association with the obtained original information on the target application by: constructing a mapping structure, and storing, in the mapping structure, the new application label, the obtained package name and the obtained class name of the target application respectively as application items (appitems). A mapping structure may serve as a node of application items in the list of applications. A mapping structure may be stored in a data partition set in the terminal. The data partition may be placed in any storage space in the terminal other than where the terminal's own original system operating data are stored. Therefore, when the user restores factory default settings of the terminal, the terminal will delete the mapping structure during automatic removal of application data.

In practical application, the original information on the target application may be obtained and the new application label may be stored in association with the obtained original information on the target application by a package manager in the terminal. After the user selects the target application and inputs the new application label of the target application via the set application gateway, an acknowledgement message will be sent when the user clicks on an acknowledgement option to trigger the package manager. The acknowledgement message may include the new application label. The package manager may obtain the original information on the target application via an upper application package information managing interface provided thereof. The package manager may obtain the package name and the class name uniquely identifying the target application, construct a mapping structure, store, in the mapping structure, the new application label together with the obtained package name and the obtained class name, and then place the mapping structure in the list of applications.

Before the mapping structures is constructed, the method may include steps as follows. Data in each node of application items in the list of applications may be traversed. It may be determined whether there is, in the data in the nodes of application items in the list of applications, a matching application with original information matching the obtained original information of the target application. If so, it means that information relevant to the target application has been stored in the list of applications, and it is only required to replace an application label of the matching application in the data in the nodes of application items with the new application label. If not, it means that the target application is not included in the list of applications, and a mapping structure may then be constructed, the new application label may be stored, together with the obtained package name and the obtained class name, in the constructed mapping structure, and then the mapping structure may be placed in the list of applications.

The package manager may be a standard service located at a frame layer of the operating system of the terminal. The package manager may be for packaging all data structures based on loading information. The package manager may provide various upper application package information managing interfaces may be provided. Aforementioned operation according to an embodiment herein may extend function of the package manager.

In practical application, when an application with a modified application label is to be used, after the user selects the target application by clicking on it, the package manager of the operating system of the terminal will obtain the original information on the target application according to the new application label stored in association with the original information on the target application to complete a subsequent operation on the target application.

Figure 2:
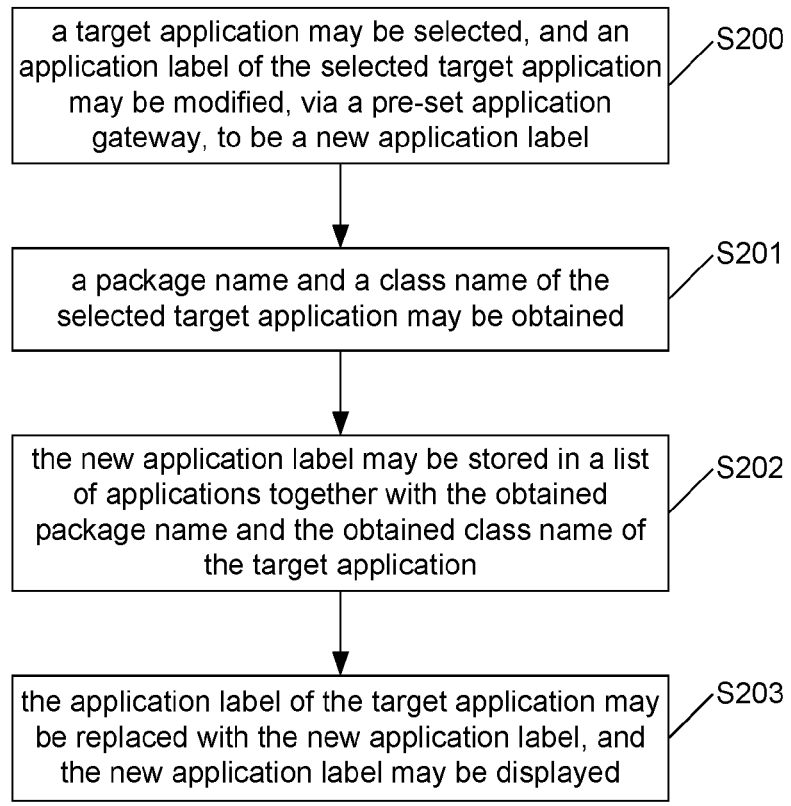
FIG. 2 is a specific flowchart of a method for modifying an application label according to an embodiment herein.

FIG. 2 is a specific flowchart of a method for modifying an application label according to an embodiment herein. As shown in FIG. 2, the method for modifying an application label according to an embodiment herein may include steps as follows.

In S200, a target application may be selected, and an application label of the selected target application may be modified, via a pre-set application gateway, to be a new application label.

In S201, a package name and a class name of the selected target application may be obtained.

In S202, the new application label may be stored in a list of applications together with the obtained package name and the obtained class name of the target application.

A mapping structure corresponding to the selected target application may have to be constructed first. The new application label, the package name, and the class name of the target application may then be stored in the mapping structure respectively as application items.

The package name, the class name, and the new application label of each target application may serve as a node of application items in the list of applications. That is to say, a node of application items may be a mapping structure. A diagram of a structure of a mapping structure of a target application according to an embodiment herein may be as follows.

```
<applist>
    <appitem>
        <packagename></ packagename>
        <classname></ classname>
        <applabel></ applabel>
    </ appitem>
</ applist>
```

Optionally, in S203, the application label of the target application may be replaced with the new application label, and the new application label may be displayed.

A user may select a target application, input a new application label, and send an acknowledgment message including the new application label. After the acknowledgment message is received, the package name and the class name of the selected target application may be obtained. The data in the nodes of application items may be read. It may be determined whether the obtained package name and the obtained class name of the target application match a package name and a class name of an application in data in a node of application items. If so, the package name and the class name of the matching application in the data in the matching node of application items may be replaced with the new application label, and the new application label may be displayed. When the obtained package name and the obtained class name of the target application match the package name and the class name of no application in the data in the nodes of application items, a mapping structure may be created, the new application label included in the acknowledgment message may be stored, together with the obtained package name and the obtained class name, in the mapping structure, and the mapping structure may be placed in the list of applications as a new node of application items.

The data in the nodes of application items may be read as follows. When a number of read nodes of application items is 0, a current operation may be ended. When a number of read nodes of application items is greater than 0, the data in each of the nodes of application items may be read, and a package name and a class name of an application in the read data may be compared to the obtained package name and the obtained class name, until a matching application is found or until the matching has been performed on each of the nodes of application items.

Figure 3:
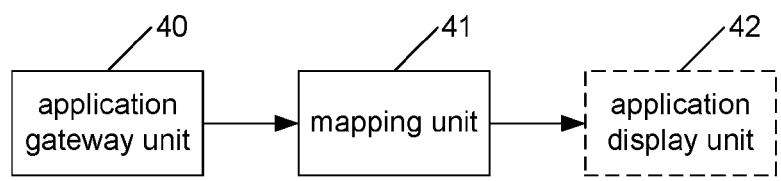
FIG. 3 is a diagram of a structure of a device for modifying an application label according to an embodiment herein.

An embodiment herein also provides a non-transitory computer-readable storage medium, including instructions for executing the method for modifying an application label. FIG. 3 is a diagram of a structure of a device for modifying an application label according to an embodiment herein. As shown in FIG. 3, the device for modifying an application label includes an application gateway unit 40 and a mapping unit 41.

The application gateway unit 40 may be configured for: after a target application is selected, modifying an application label of the selected target application to be a new application label according to an input.

The application gateway unit 40 may be pre-arranged in the mobile terminal, such as in a setting module of the mobile terminal, or as a separate functional module.

The mapping unit 41 may be configured for obtaining original information on the selected target application, and storing the new application label in association with the obtained original information on the target application.

The mapping unit 41 may be implemented by a package manager.

The mapping unit 41 may be configured for storing the new application label in association with the obtained original information on the target application by: storing the new application label in a list of applications together with the obtained original information on the target application. The original information on the target application may include a package name and a class name that uniquely identify the target application.

The mapping unit 41 may be configured for storing the new application label in association with the obtained original information on the target application by: constructing a mapping structure, and storing, in the mapping structure, the new application label, the obtained package name and the obtained class name of the target application respectively as application items. A mapping structure may serve as a node of application items in the list of applications.

In order to replace the application label of the target application and display the new application label of the target application, the device for modifying an application label may further include an application display unit 42 configured for receiving and displaying the new application label.

The application gateway unit 40 may be configured for: after the target application has been selected, receiving the input new application label, and sending an acknowledgment message including the new application label.

The mapping unit 41 may be configured for: after receiving the acknowledgment message, obtaining the package name and the class name of the selected target application; reading data in nodes of application items in the list of applications; in response to determining that there is, in the read data in a node of application items, a matching application with a package name and a class name that match the obtained package name and the obtained class name, replacing an application label of the matching application in the data in the nodes of application items with the new application label, and sending a modification message including the new application label to the application display unit 42. The application display unit 42 may be configured for displaying the new application label after receiving the modification message.

The mapping unit 41 may be configured for: in response to determining that a number of read nodes of application items is 0, ending a current operation; in response to determining that a number of read nodes of application items is greater than 0, reading data in each of the nodes of application items and matching a package name and a class name of an application in the read data to the obtained package name and the obtained class name, until a matching application is found or until the matching has been performed for each of the nodes of application items.

In practical application, the application gateway unit 40, the mapping unit 41, and the application display unit 42 may be implemented by a Central Processing Unit (CPU), a Micro Processor Unit (MPU), a Digital Signal Processor (DSP), a Field-Programmable Gate Array (FPGA) or the like located in the terminal.

Those skilled in the art will know that an embodiment herein may provide a method, device, system, or computer program product. Therefore, an embodiment herein may take on a form of hardware, software, or a combination thereof. In addition, an embodiment herein may take on a form of a computer program product implemented on one or more computer available storage media (including but not limited to, magnetic disk memory, optic memory, and the like) containing computer available program codes.

The disclosure is illustrated with reference to flowcharts and/or block diagrams of the method, device (system) and computer-program product according to embodiments described herein. Note that each flow in the flowcharts and/or each block in the block diagrams as well as combination of flows in the flowcharts and/or blocks in the block diagrams may be implemented by instructions of a computer program. Such instructions may be offered in a processor of a general-purpose computer, a dedicated computer, an embedded processor or other programmable data processing devices to generate a machine, such that a device with a function specified in one or more flows of the flowcharts and/or one or more blocks in the block diagrams is produced by instructions executed by a processor of a computer or other programmable data processing devices.

These computer-program instructions may also be stored in a non-transitory computer-readable memory capable of guiding a computer or another programmable data processing device to work in a given way, such that the instructions stored in the computer-readable memory generate a manufactured good including an instruction device for implementing a function specified in one or more flows of the flowcharts and/or one or more blocks in the block diagrams.

These computer-program instructions may also be loaded in a computer or other programmable data processing devices, which thus executes a series of operations thereon to generate computer-implemented processing, such that the instructions executed on the computer or other programmable data processing devices provide the steps for implementing the function specified in one or more flows of the flowcharts or one or more blocks in the block diagrams.

What described are merely embodiments of the disclosure and are not intended to limit the protection scope of the disclosure.

INDUSTRIAL APPLICABILITY

With the method and device for modifying an application label and the non-transitory computer-readable storage medium according to embodiments herein, a target application is selected, and an application label of the selected target application is modified, via a pre-set application gateway, to be a new application label; and original information on the selected target application is obtained, and the new application label is stored in association with the obtained original information on the target application. A user is allowed to modify an application label as needed in any desktop without impacting normal use of an application and without the need for a specific permission.

The invention claimed is:

1. A method for modifying an application label to be displayed on a desktop, comprising:
    receiving selection of a target application on the desktop by a user;
    modifying, via a pre-set application gateway, an application label of the selected target application to be displayed as a new application label;
    obtaining original information on the selected target application;
    storing the new application label in association with the obtained original information on the selected target application in a mapping structure; and
    displaying the new application label,
    wherein the original information on the selected target application comprises a package name and a class name that uniquely identify the selected target application,
    wherein the modifying the application label of the selected target application to be displayed, obtaining the original information on the selected target application, and storing the new application label in association with the obtained original information on the selected target application comprises:
    receiving the new application label to be displayed input via the pre-set application gateway;
    obtaining the package name and the class name of the selected target application from the original information;
    reading data in nodes of application items in a list of applications;
    determining whether there is, in the read data, a matching application with a package name and a class name that match the obtained package name and the obtained class name of the selected target application;
    in response to determining that there is the matching application, replacing the application label of the matching application in the mapping structure in the node of application items with the received new application label; and
    in response to determining that there is no matching application, constructing a mapping structure corresponding to the selected target application, storing, in the constructed mapping structure, the received new application label together with the obtained package name and the obtained class name as application items, and placing the constructed mapping structure in the list of applications as a new node of the application items in the list of applications,
    wherein the method further comprises:
    when the selected target application with the new application label displayed is to be used, after the user selects the selected target application with the new application label displayed, obtaining the original information on the selected target application according to the new application label stored in the mapping structure of the new node in association with the original information on the selected target application to complete a subsequent operation on the selected target application.

2. The method according to claim 1, wherein the reading data in nodes of application items comprises: in response to determining that a number of read nodes of application items is greater than 0, reading data in each of the nodes of application items and matching a package name and a class name of an application in the read data to the obtained package name and the obtained class name, until a matching application is found or until the matching has been performed for each of the nodes of application items.

3. A device for modifying an application label to be displayed on a desktop, comprising a processor and memory storing instructions executable by the processor, wherein the processor is configured for:
    receiving selection of a target application on the desktop by a user;
    modifying, via a pre-set application gateway, an application label of the selected target application to be displayed as a new application label;
    obtaining original information on the selected target application;
    storing the new application label in association with the obtained original information on the selected target application in a mapping structure; and
    displaying the new application label,
    wherein the original information on the selected target application comprises a package name and a class name that uniquely identify the selected target application,
    wherein the modifying the application label of the selected target application to be displayed, obtaining the original information on the selected target application, and storing the new application label in association with the obtained original information on the selected target application comprises:
    receiving the new application label to be displayed input via the pre-set application gateway;
    obtaining the package name and the class name of the selected target application from the original information;
    reading data in nodes of application items in a list of applications;
    determining whether there is, in the read data, a matching application with a package name and a class name that match the obtained package name and the obtained class name of the selected target application;
    in response to determining that there is the matching application, replacing the application label of the matching application in the mapping structure in the node of application items with the received new application label; and
    in response to determining that there is no matching application, constructing a mapping structure corresponding to the selected target application, storing, in the constructed mapping structure, the received new application label together with the obtained package name and the obtained class name as application items, and placing the constructed mapping structure in the list of applications as a new node of the application items in the list of applications,
    wherein the processor is further configured for:
    when the selected target application with the new application label displayed is to be used, after the user selects the selected target application with the new application label displayed, obtaining the original information on the selected target application according to the new application label stored in the mapping structure of the new node in association with the original information on the selected target application to complete a subsequent operation on the selected target application.

4. The device according to claim 3, wherein the processor is configured for: in response to determining that a number of read nodes of application items is greater than 0, reading the data in the nodes of application items node by node and matching a package name and a class name of an application in the read data to the obtained package name and the obtained class name, until a matching application is found or until the matching has been performed for each of the nodes of application items.

5. A non-transitory computer-readable storage medium, comprising instructions for executing a method for modifying an application label to be displayed on a desktop, the method comprising:

receiving selection of a target application on the desktop by a user;

modifying, via a pre-set application gateway, an application label of the selected target application to be displayed as a new application label;

obtaining original information on the selected target application;

storing the new application label in association with the obtained original information on the selected target application in a mapping structure; and displaying the new application label, wherein the original information on the selected target application comprises a package name and a class name that uniquely identify the selected target application, wherein the modifying the application label of the selected target application to be displayed, obtaining the original information on the selected target application, and storing the new application label in association with the obtained original information on the selected target application comprises:

receiving the new application label to be displayed input via the re-set application gateway;

obtaining the package name and the class name of the selected target application from the original information;

reading data in nodes of application items in a list of applications;

determining whether there is, in the read data, a matching application with a package name and a class name that match the obtained package name and the obtained class name of the selected target application;

in response to determining that there is the matching application, replacing the application label of the matching application in the mapping structure in the node of application items with the received new application label; and in response to determining that there is no matching application, constructing a mapping structure corresponding to the selected target application, storing, in the constructed mapping structure, the received new application label together with the obtained package name and the obtained class name as application items, and placing the constructed mapping structure in the list of applications as a new node of the application items in the list of applications, wherein the method further comprises:

when the selected target application with the new application label displayed is to be used, after the user selects the selected target application with the new application label displayed, obtaining the original information on the selected target application according to the new application label stored in the mapping structure of the new node in association with the original information on the selected target application to complete a subsequent operation on the selected target application.

6. The non-transitory storage medium according to claim 5, wherein the reading data in nodes of application items comprises: in response to determining that a number of read nodes of application items is greater than 0, reading data in each of the nodes of application items and matching a package name and a class name of an application in the read data to the obtained package name and the obtained class name, until a matching application is found or until the matching has been performed for each of the nodes of application items.

* * * * *